UNITED STATES PATENT OFFICE.

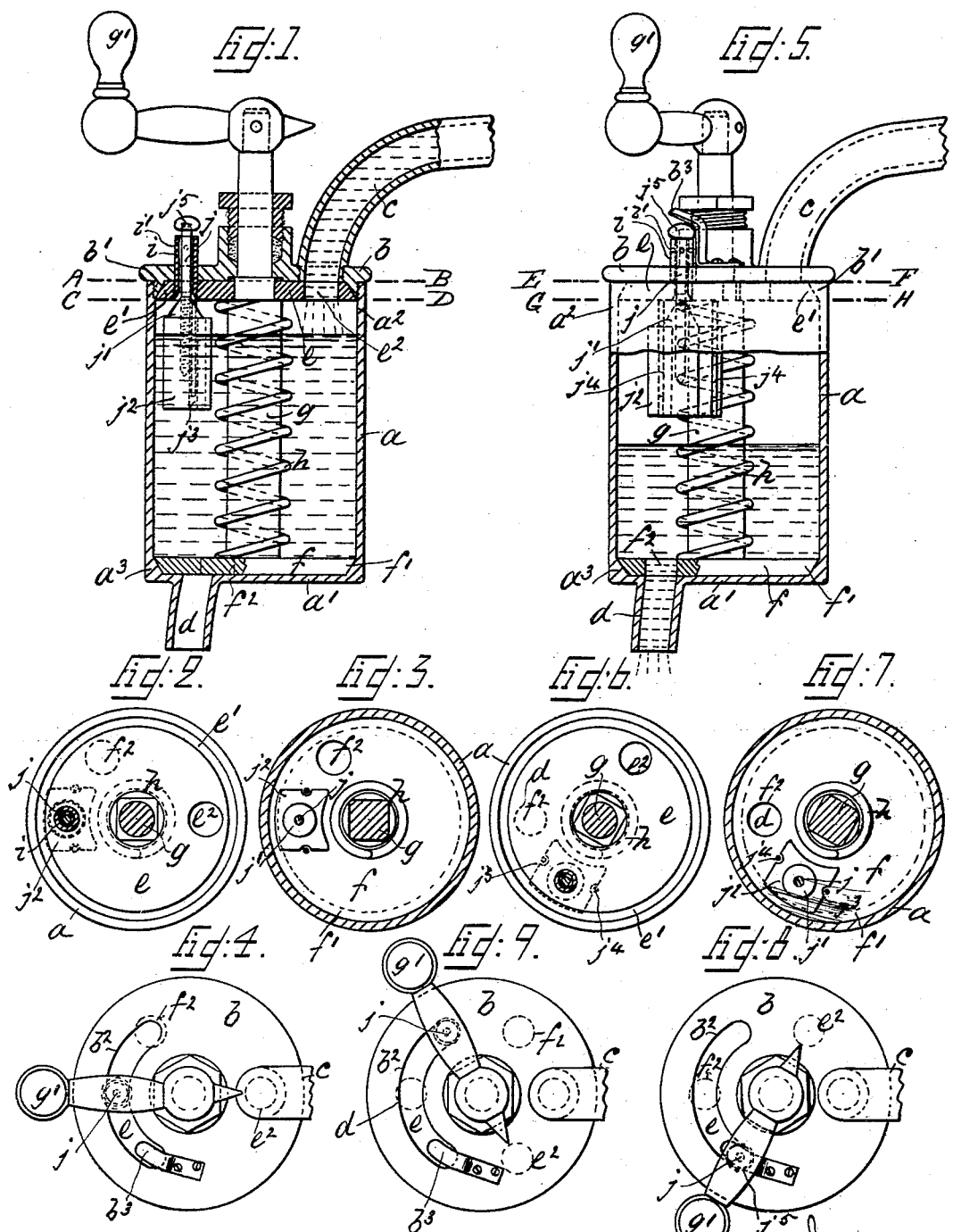

ALICE WOOLLATT, OF NOTTINGHAM, ENGLAND.

MEASURING-TAP.

SPECIFICATION forming part of Letters Patent No. 625,487, dated May 23, 1899.

Application filed August 4, 1898. Serial No. 687,740. (No model.)

*To all whom it may concern:*

Be it known that I, ALICE WOOLLATT, a subject of the Queen of Great Britain and Ireland, and a resident of Nottingham, England, have invented certain new and useful Improvements in Measuring-Taps, (for which I have filed an application for British patent, No. 15,796, dated July 19, 1898,) of which the following is a specification.

This invention relates to an improved measuring-tap designed to meet the requirements of dealers in liquids vended in measured quantities; and it consists of a measuring-tap in which the several features hereinafter described are combined in coöperative relation, as described with reference to the accompanying drawings, in which—

Figure 1 is a sectional elevation showing the parts in the positions occupied when the tap is filling. Fig. 2 is a sectional plan on A B, Fig. 1, with the cover removed. Fig. 3 is a sectional plan on C D, Fig. 1. Fig. 4 is a plan. Fig. 5 is a sectional elevation showing the parts in the positions occupied when the tap is emptying. Fig. 6 is a sectional plan on E F, Fig. 5. Fig. 7 is a sectional plan on G H, Fig. 5. Fig. 8 is a plan, and Fig. 9 is a plan showing the parts in the positions occupied when the tap is fully charged and is shut off from both the liquid-inlet and the liquid-outlet.

$a$ is a container which is made of such dimensions as are determined by its required capacity and is closed at one end $a'$ and is open and fitted with a removable cover $b$ at the other end $a^2$, or it may be open and fitted with a removable cover at each end to facilitate access to its interior, and is formed with an inlet $c$ for the liquid to be measured and with an outlet $d$ for the measured liquid. Internally the container is fitted with a pair of shut-off plates $e\ f$, which are formed with coned peripheries $e'\ f'$ and are secured to and located by a spindle $g$ and are adapted to truly fit in coned seatings $b'\ a^3$, formed in the container ends $b\ a'$, respectively, or the plates $e\ f$ may be borne against their seatings by a spring $h$. The plates $e\ f$ are also respectively formed with through-holes $e^2\ f^2$, which respectively are equidistant from the axis of the spindle with the liquid inlet and outlet apertures $c\ d$, with which they are adapted to respectively communicate, and are so located in relation to each other that they cannot both together communicate with such inlet and outlet apertures, and that they can both together be shut off from communicating therewith, and that each one can be caused to communicate with its respective aperture, as required, the plates being thus adapted to close the said inlet and outlet apertures one at a time in such a manner that while the outlet is closed (*vide* Figs. 1 to 4) the inlet may be open, so that the liquid can freely flow from a reservoir into the container, or may be closed, (*vide* Fig. 9,) and that while the outlet is open (*vide* Figs. 5 to 8) the inlet is closed.

The upper plate $e$ is fitted with a vent-tube $i$, which opens into the container and protrudes through a sectoral slot $b^2$, made in the cover $b$, of such a length as to accommodate the two extreme positions of the shut-off plates, (*vide* Figs. 8 and 9,) the tube $i$ being thus caused to serve the two purposes of acting as a vent to the container, its projecting part being perforated, as at $i'$, permitting the inflow and outflow of the liquid and of determining the two extremes of the movements of the shut-off plates. The tube $i$ serves to support a valve-stem $j$, which is fitted with a valve $j'$, serving to close the inner end of the tube, and with a float $j^2$, which causes the valve to shut as the container fills with the liquid, the float being formed with grooves $j^3$, which engage with guide-pins $j^4$, which project from the plate $e$. The outer end of the stem $j$ is fitted with a knob $j^5$, which prevents the valve from falling into the container when it is emptying, and when the parts are moved into the emptying position (*vide* Fig. 5) is adapted to engage with a depressor $b^3$, which depresses the valve $j'$ from its seating in the plate $e$ and permits of the air entering the container, so as to allow of the unimpeded escape of the liquid therefrom.

The spindle $g$ protrudes through a stuffing-box on the cover $b$ and is fitted with a handle $g'$, by which it can be turned about its axis, so as to actuate the shut-off plates to the extent limited by the engagement of the vent-tube $i$ with the ends of the sectoral slot $b^2$, as aforesaid. The spindle may be connected in any convenient manner to suitable registering apparatus adapted to be operated at each filling or emptying actuation of the handle, so as to automatically record the total quantity of liquid measured out.

What I claim as my invention is—

1. In a measuring-tap, in combination, a container, a shut-off device and a vent device respectively adapted as set forth; the container having a cover formed with a stuffing-box and a sectoral slot, an inlet and an outlet, and being formed with conical seatings within its ends; the shut-off device consisting of plates located on a common spindle which extends through the stuffing-box of the cylinder-cover and formed with inlet and outlet holes respectively arranged to communicate with the inlet and outlet of the container, one at a time, and to be shut off from both together, and with coned peripheries, and of a spring adapted to press the plates truly against the conical seatings of the container; and the venting device consisting of a perforated tube fitted to a vent-hole in the upper shut-off plate and of a guided valve-rod, valve and float coöperating to close the air-vent as the container fills with the liquid, and of a depressor fitted to the cover and adapted to depress the valve from the vent-tube when the outlets of the lower shut-off plate and of the container communicate, the vent-tube and the sectoral slot in the container-cover also coöperating to determine the extremes of the movements of the shut-off plates, as set forth.

2. In a measuring-tap, the combination with a container having in its ends an inlet and an outlet opening, and a slot in the end containing the inlet-opening, of a spindle extending lengthwise through the container, plate-valves carried by said spindle and coöperating with the inlet and outlet, a venting device carried by one of said plates and having a stem projecting through the slot, and a depressor adapted to operate the venting device when the inlet is open, substantially as described.

3. In a measuring-tap, the combination with a container having in its ends an inlet and an outlet aperture and a slot in the end containing the inlet-aperture, of a spindle extending lengthwise through the container, plate-valves carried by said spindle and coöperating with the inlet and outlet apertures, a tube carried by one of the plates and projecting through the slot, a stem supported in the tube, and a vent-valve on the inner end of the stem, substantially as described.

4. In a measuring-tap, the combination with a container having in its ends an inlet and an outlet aperture and a slot in the end containing the inlet-aperture, of a spindle extending lengthwise through the container, plate-valves carried by said spindle and coöperating with the inlet and outlet apertures, a tube carried by one of the plates and projecting through the slot, a stem supported in the tube, a vent-valve on the inner end of the stem, and a float attached to said valve, substantially as described.

5. In a measuring-tap, the combination with a container, having a slot in one end, of a plate-valve resting against said end, a tube carried by said plate and projecting through the slot, a stem supported in the tube, a valve on the inner end of the stem, a float attached to the valve, having grooves in its sides, and guide-pins fixed in the plate and engaging with said grooves, substantially as described.

Signed at the United States consulate, at Nottingham, England, this 22d day of July, 1898.

ALICE WOOLLATT.

Witnesses:
WILLIAM HENRY WOOLLATT,
THOMAS HENRY COOK.